Nov. 14, 1961 A. SZEGVARI 3,008,657
BALL CONTAINING APPARATUS FOR FINELY
GRINDING LIQUID SUSPENDED ARTICLES
Filed Sept. 4, 1957 2 Sheets-Sheet 1

INVENTOR.
ANDREW SZEGVARI

ATTORNEY 3,008,657
BALL CONTAINING APPARATUS FOR FINELY
GRINDING LIQUID SUSPENDED ARTICLES
Andrew Szegvari, 201 Castle Blvd., Akron, Ohio
Filed Sept. 4, 1957, Ser. No. 681,951
1 Claim. (Cl. 241—170)

This invention relates to an apparatus for finely grinding particles suspended in a liquid.

The invention is an improvement over the apparatus more specifically disclosed in U.S. 2,764,359, in which a mass of elements are maintained in an agitated state by kinetic energy imparted to them by an agitator, and fine grinding is produced by the impact of the activated elements on suspended particles of the material to be ground.

In processing with agitated balls or other grinding or agitating elements in conventional equipment like ball mills, where the agitation is brought about largely by the interaction of such balls with the container walls, the grinding is slow and the processed material is contaminated with impurities originating from the walls where the most of the agitation and grinding takes place. The above-mentioned patent which utilizes a stationary vessel and agitates the grinding elements from within, goes a long way to improve on these conditions by concentrating the action into the inner part of the processing area and thereby providing a zone of relative rest at the walls of the vessel.

According to this invention, the agitation is increased within a vessel without increasing the agitation at the walls of the grinding vessel. This reduces the wear on the wall and consequently reduces contamination of the material being ground. This increased agitation is produced by using two or more agitators, all revolving in the same direction, and arranged close enough together so that in a zone between any two agitators, the energy released on the collisions between almost any two elements is greater than if only one agitator were employed.

The energy available at contact in a zone in which balls activated by different agitators collide with one another, is essentially four times as much as between grinding elements in an individually agitated mass. This energy will project itself into the surrounding medium in repeated kinetically statistical contacts, causing an extended region in which considerably more energy is available at collisions than within a single agitated mass. In this zone between two agitators there are produced a substantial number of collisions where four times larger kinetic energy is available than is in a single agitator activated mass. This takes place without any increase of the agitation at the walls of the vessel. Thus considerably more action is created inside of the system without increasing activity at the wall, and therefore with reduced contamination coming from the wall of the vessel. On the other hand, one could slow down the speed of the bordering agitators to one-half of the speed of a system utilizing a single agitator and still maintain the previous kinetic conditions in a specially activated zone between the agitators with decrease in the agitation at the walls of the vessel to one-half of its previous value.

In the improved device of this invention the agitated mass of grinding or agitating elements activated by one revolving agitator is not confined by a wall, but is bounded at least in part by an agitated mass of grinding elements activated by another revolving agitator, both agitators being revolved in the same direction on substantially parallel axes. There may be three or more such agitated masses in proximity to one another. In the zone or zones between and adjacent the agitators there is a certain statistical probability for collisions between grinding elements from the different agitated masses with relative speeds at contact which are twice as much as between grinding elements in the respective masses. This increased grinding activity is obtained without any increased wear of the grinding elements on the agitators or the walls of the vessel.

This use of a plurality of agitators is advantageous in many situations involving agitating or grinding elements as described, of which four are mentioned, and then discussed in some detail, as illustrative. These are—

(1) Processing in small equipment for research and laboratory purposes where the ratio of the wall area to the processing volume is large and contamination by impurities derived from the wall structure is great;

(2) Processing to obtain a product of an extremely fine particle size range, under one-half a micron;

(3) Processing extremely hard materials, the mineralogical hardness of which is above 7;

(4) Processing of sensitive materials like biological preparations, medicinals and other edible products in which more than a trace of impurities derived from the wall structure of the agitating vessel is objectionable.

The difficulties in such situations are explained, at least in part, as follows:

(1) In small size apparatus, the difficulty originates as follows: In a cylindrical vessel where the agitation is brought about by a rotating agitator, and the speed of movement V at any place R from center is $2R\pi$; the kinetic energy available for mechanical action is $MV^2/2$. The centrifugal force at R which pushes the grinding or agitating elements against the walls is $\omega^2 \times R \times M$ where $\omega$ is the angular velocity. In order to maintain any given kinetic energy condition at the agitator tips, $\omega$ must be increased as R is reduced. In a small vessel, R is small so $\omega$ must be relatively large. However, since the angular velocity enters at second power, the centrifugal force and the action which generates impurities from the wall are greatly increased over that required to maintain a given kinetic energy condition in a vessel in which R is larger.

(2) In obtaining a product with a particle-size range under one-half micron, it is desirable or necessary to use smaller balls than ordinarily used in producing a product of larger particle size. The smaller balls do not have the momentum necessary to have intensive mechanical action unless high speeds are used which involve greater centrifugal force and wear on the walls.

(3) In processing hard materials, the trouble has been that the action of the agitation at the walls of the vessel causes too much mechanical attack on the walls. This is accentuated by the speed of agitation which is increased beyond that ordinarily used, in order to deal with hard materials efficiently.

(4) In processing chemically sensitive materials like biochemical preparations, medicinals, etc. it is required to keep impurities at an extremely low level, which is facilitated by low r.p.m. of the agitator. It has been necessary in some cases to use grinding or agitating elements of lower specific gravity, or in other words, lower mass, to minimize the grinding action on the walls, and it has been difficult to maintain the desired agitation with these agitating elements.

The distance between the agitators is such that the energy made available in the zone or zones between them is greater than if there were only one agitator present. If the distance be less than about three element diameters, the system tends to jam. The most efficient distance will depend upon the size and mass of the elements, the speed of the agitators, the length of the agitator arms, etc.

There may be two agitators, or three agitators or more in a vessel, with such zones of increased activity about and between the agitators. The agitators usually each comprise a vertical shaft with radially projecting arms and whilst the ends of the arms of adjacent agitators are in proximity to one another, the distance between them at the nearest points of approach is at least three times the diameter of a single grinding or agitating element, so that it is impossible for jamming of the grinding or agitating elements to occur between the arms. All of the grinding or agitating elements are of substantially the same size and shape.

In a preferred device, several arms of the same length are provided on each agitator, the agitator arms on the several agitators are arranged in the same planes and the arms of the different agitators are so spaced that the cylinder traced by the ends of the arms of each agitator is at least about three grinding-element diameters from the cylinder traced by the arms of an adjacent cylinder (or each adjacent cylinder). Alternatively the arms can be arranged so as to pass over or under an arm or arms of the adjacent agitator (or agitators) by about this distance. A still further arrangement with the arms of adjacent agitators in the same plane but to prevent them coming into alignment, they are geared at an angle of perhaps 90 degrees to one another. In each of the last two arrangements the axes of the agitator shafts are closer to one another than the maximum diameter swept by each agitator.

If there are two agitators, the vessel containing them may be generally elliptical in shape. If there are three agitators, the vessel may have a triangular shape with rounded corners. However, because a cylindrical vessel is most practical, economically speaking, the preferred form of the invention constitutes three or more agitators in an upright cylindrical vessel. The most practical form for the agitator is a vertical shaft with horizontal arms extending from it.

The invention will be further described in connection with the accompanying drawings, in which—

Figure 1:
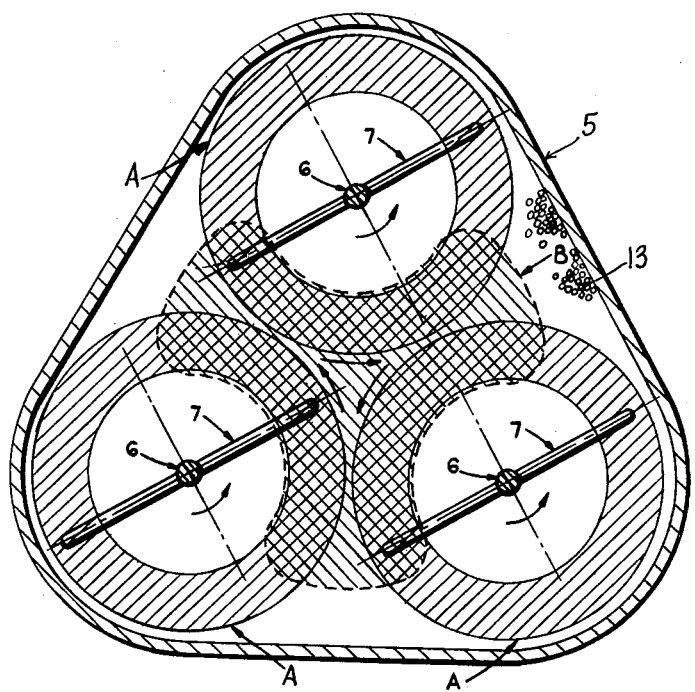
FIG. 1 is a horizontal section through an upright cylindrical vessel containing three agitators.

It is understood that the invention is not limited to the equipment illustrated in the drawings, but such equipment is illustrative only.

Figure 2:
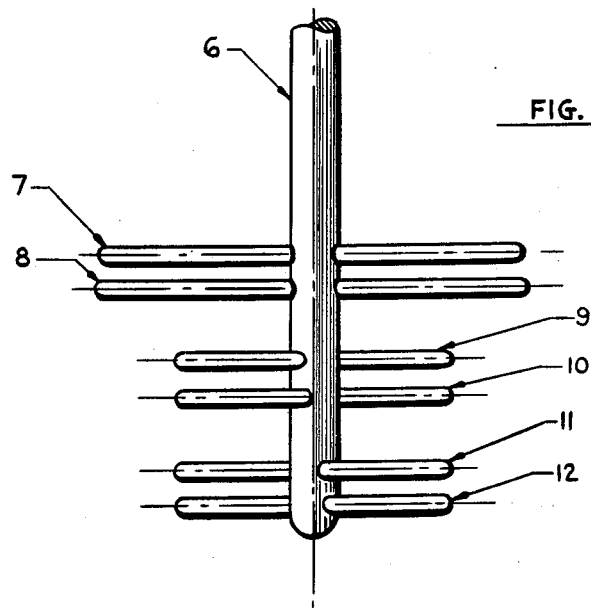
FIG. 2 illustrates in elevation one of the agitators.
Figure 3:
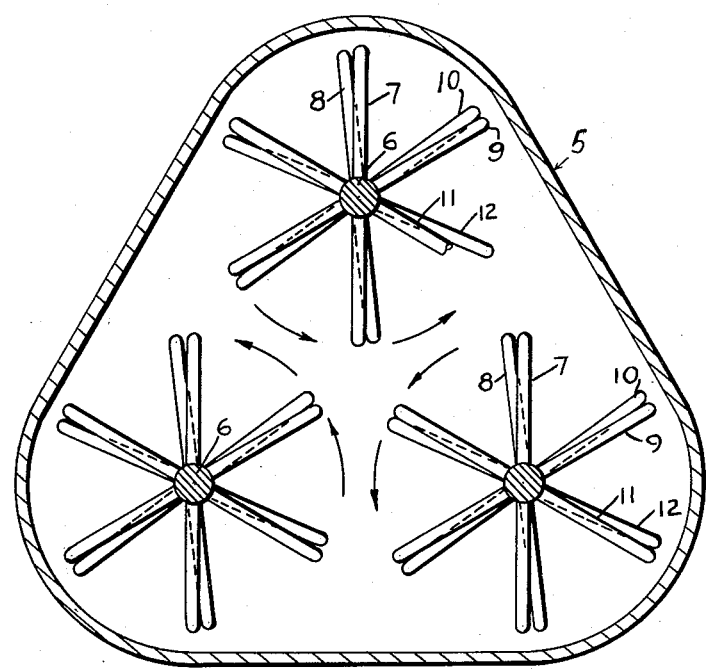
FIG. 3 is a plan view of the agitators in the vessel of FIG. 1 omitting the agitating elements.
Figure 4:
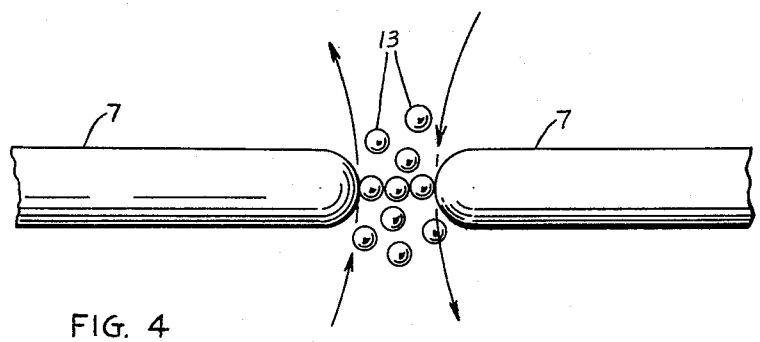
FIG. 4 is an enlarged detail of the ends of two agitator arms and the agitating elements between them.

The vessel 5 is equipped with three agitators each of which comprises a shaft 6 and six agitator arms as illustrated in FIG. 2. For simplicity, FIG. 1 shows only the top agitator arm 7 on each of the agitator shafts. The other agitator arms are designated in FIG. 2 by the numerals 8, 9, 10, 11 and 12. The agitating elements 13 fill a large part of the vessel, when at rest, and in efficient operation fill the vessel relatively uniformly up to and somewhat over the top agitator arm.

The agitator arm 8 is slightly below the top agitator arm 7, and is angularly slightly forward of it, so that the tendency of the pair of arms is to lift the liquid and the suspended particles and agitating elements as the agitator revolves. Each pair of arms is similarly arranged. The distance between the arms of each pair is about two or three element diameters so that they permit liquid to pass between them, and yet they contact the moving elements in their path. This type of agitator is disclosed in more detail in my said patent.

The agitators are equipped with suitable driving means for rotating all of them at the same speed and in the same direction as indicated in FIG. 1. The vessel is stationary. It is advantageously mounted as described in my said patent.

As each agitator activates the elements within its range, these elements drift in the direction of rottaion of the agitator. The letters A indicate the zones in which the elements are preferentially activated by the respective agitators and in which the drift of the elements is most pronounced. In the equipment shown in the drawings, the arms on the respective agitator shafts are in the same plane. In the zones B between the ends of the arms of different agitators the elements drift in the direction opposite to the drift of the elements activated by the adjacent agitator which is moving in the opposite direction. The elements are especially highly activated in this zone and the energy released by the contact of the elements drifting in one direction with the elements drifting in the other direction, is much greater than the energy released by contacts between the elements in an identical system containing but a single agitator.

The size and composition of the grinding elements will depend upon the nature of the treatment desired and will in part depend upon the viscosity of the liquid, etc. They will be at least about 3/32 inch in diameter and have sufficient weight to be projected through the liquid by the agitator when operating at any required speed.

The invention will be further described in connection with the following examples which are illustrative.

Example 1

A small size equipment, designed for research and development purposes, was used in carrying out this process. The container was an upright cylindrical container which had a diameter of 5 inches and a depth of 3½ inches with a total capacity of about 1000 cubic centimeters. It contained three agitators. Each agitator comprised a vertical driving shaft to which were attached six agitator arms, each of which extended horizontally 11/16 inch from the opposite sides of the shaft. The agitator arms were arranged in pairs, as illustrated in FIG. 2 of the drawings. The grinding elements were highly sintered aluminum oxide balls having a diameter of 1/8 inch. (When extremely fine dispersions are to be made in equipment of this sort stainless steel balls of 3/32 inch in diameter may be used).

A dispersion of procain penicillin was prepared as follows:

One hundred twenty-five grams of penicillin of No. 100 mesh were suspended in 500 grams of distilled water containing 1 percent of a usual dispersing agent such as Tween 60 (sorbitan monostearate polyoxyalkylene derivative). The suspension was processed in the agitating device using aluminum oxide balls 3/16 inch in diameter, revolving the shaft at 100 r.p.m. The treatment lasted 100 minutes. The result was a uniform dispersion of penicillin having a particle size of 1 to 2 microns.

Example 2

Pilot size equipment was used consisting of two agitators within an ovoid-shaped container. This container was 8 inches wide, 14⅞ inches long, and 7½ inches deep and had a capacity of 3½ gallons. Each agitator comprised eight agitator arms projecting sideways 2¼ inches from the drive shaft which was 1 inch in diameter. The arms were arranged in pairs as illustrated in FIG. 2.

Twenty pounds of No. 325 mesh tungsten carbide were suspended in 15 pounds of carbon tetrachloride. This was processed in this equipment, using tungsten carbide balls ¼ inch in diameter. The agitator was rotated at 110 r.p.m. and the treatment lasted two hours. The product was removed from the apparatus and the solvent was evaporated. The resulting tungsten carbide had a particle size of 5 to 7 microns.

Example 3

This process was carried out in equipment designed for the grinding of paint-type materials in large quantities. It comprised three agitators arranged equidistantly within a cylindrical stainless steel container, as illustrated in FIG. 1. The container had a diameter of 48 inches and a depth of 30 inches. It had a capacity of 235 gallons. There were six arms on the agitator, arranged in pairs (as in FIG. 2), and extending 10 inches from a vertical drive shaft.

The material treated was titanium dioxide. It was suspended in a so-called alkyd medium, which is essentially a solution of an alkyd resin in a hydrocarbon solvent. One hundred sixty gallons of such a suspension, containing 40 percent of solid titanium dioxide were placed in the unit and processed at 60 r.p.m. with flint grinding elements having an average diameter of ⅜ inch. After 80 minutes the titanium dioxide particles had a size of 0.1 to 0.2 microns and a North gauge reading of 8.

The process and equipment more particularly described are illustrative. Modifications may be made, including the various modifications disclosed in my said patent. It is to be understood that the most effective clearance between the ends of the agitator arms and the wall of the vessel, and also the distance between the two agitator arms in each pair (as shown in FIG. 2) will depend upon the size of the elements employed and the speed of rotation of the agitators, etc.

The claim defines the invention.

What I claim is:

Grinding means which comprises a vessel, a plurality of essentially spherical grinding elements all of substantially the same size therein, and three agitators arranged triangularly therein, the three agitators being so close together that the grinding impact of elements between them is greater than that of the spherical elements activated by only two of the agitators, each agitator comprising a vertical shaft with substantially horizontal arms, at least the bottom arm of each agitator being embedded in the grinding elements, and means for rapidly revolving the agitators in the same direction.

References Cited in the file of this patent

UNITED STATES PATENTS

| | | |
|---|---|---|
| 1,390,251 | Schoppner | Sept. 6, 1921 |
| 1,956,293 | Klein et al. | Apr. 24, 1934 |
| 2,764,359 | Szegvari | Sept. 25, 1956 |